United States Patent
Terai et al.

[11] Patent Number: 6,041,126
[45] Date of Patent: *Mar. 21, 2000

[54] NOISE CANCELLATION SYSTEM

[75] Inventors: Kenichi Terai, Shijyonawate; Hiroyuki Hashimoto, Daito, both of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/685,573

[22] Filed: Jul. 24, 1996

[30] Foreign Application Priority Data

Jul. 24, 1995 [JP] Japan ................................. 7-187467

[51] Int. Cl.[7] .................................................. A61F 11/06
[52] U.S. Cl. ........................ 381/71.6; 381/71.11; 381/72
[58] Field of Search ............................. 381/71, 72, 73.1, 381/94, 71.6, 71.1, 71.8

[56] References Cited

U.S. PATENT DOCUMENTS

| | | | |
|---|---|---|---|
| 4,953,217 | 8/1990 | Twiney et al. | 381/72 |
| 5,182,774 | 1/1993 | Bourk | 381/72 |
| 5,251,263 | 10/1993 | Andrea et al. | 381/71 |
| 5,384,843 | 1/1995 | Masuda et al. | 381/92 |
| 5,473,702 | 12/1995 | Yoshida et al. | |
| 5,481,615 | 1/1996 | Eatwell et al. | 381/72 |

*Primary Examiner*—Ping Lee
*Attorney, Agent, or Firm*—Smith, Gambrell & Russell, LLP

[57] ABSTRACT

A noise controlled type handset processes the output of non-directional noise detector installed outside of the handset by a first adaptive filter, delivers a control sound from a control speaker, controls the first adaptive filter so that the output of an error detector near the ear may be small, simultaneously processes the noise detection signal in a second adaptive filter, subtracts from the noise signal mixing into a bi-directional talking microphone, and controls the second adaptive filter so that the subtraction signal may be small, thereby taking back the signal of voice only by reducing noise by delivering through the speaker, and sending a transmission output at the same time.

29 Claims, 15 Drawing Sheets

Noise coming direction

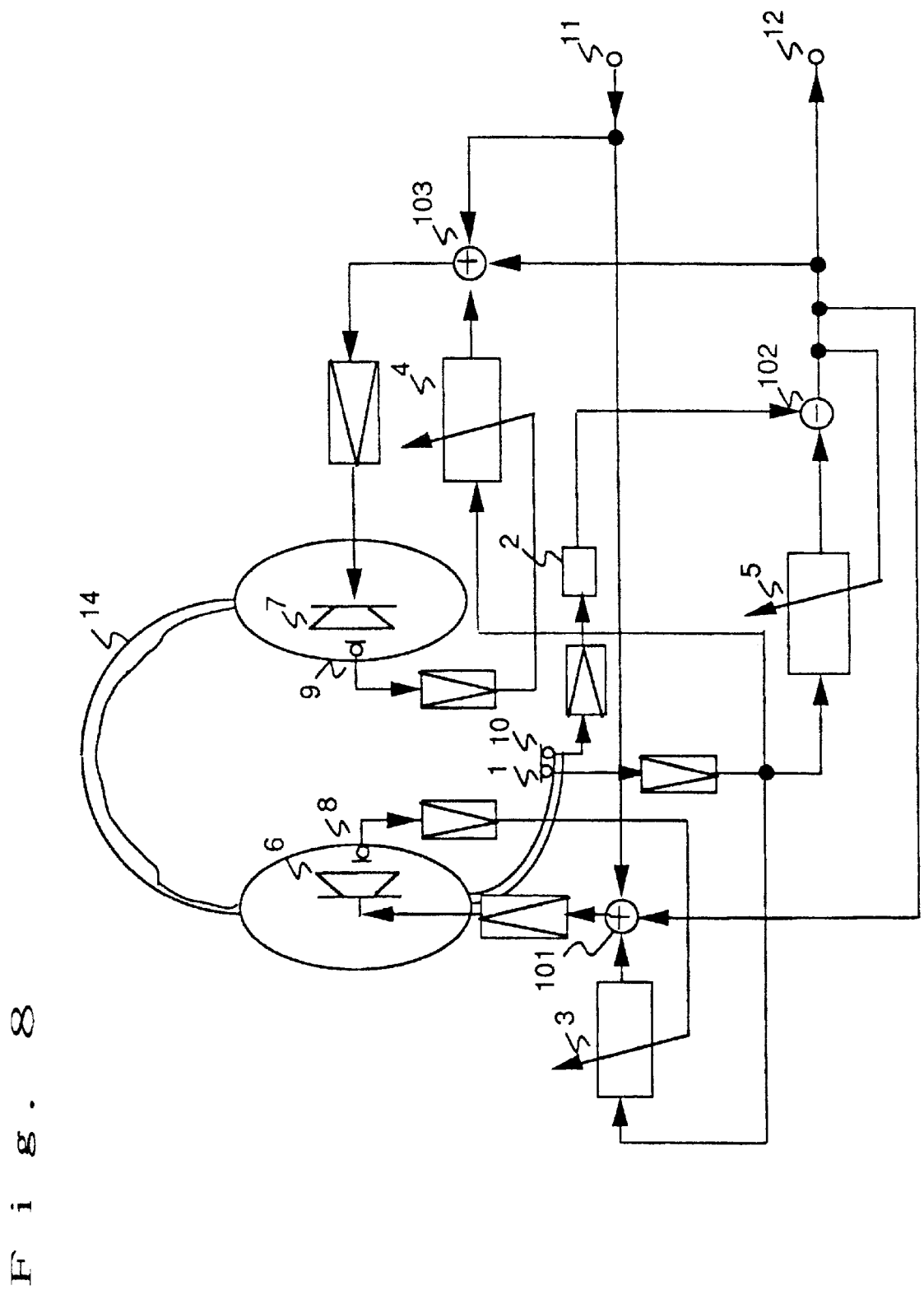

NOISE CANCELLATION SYSTEM

BACKGROUND OF THE INVENTION

1. Field of the Invention

The present invention relates to a noise controlled handset using active noise control in a noisy environment.

2. Related Art of the Invention

Recently, an active noise control device for silencing the environmental noise at the ear by control sound from a speaker is proposed.

This type of noise silencing device was generally structured as shown in FIG. 14. The constitution is described below by referring to FIG. 14. In FIG. 14, an output signal of an error detector 8 of a handset 13 is processed in a gain phase regulator 18, and a control sound is delivered from a control speaker 6, and is negatively fed back to the error detector 8.

On the other hand, a signal from a receiving signal input terminal 11 is combined with an output of the gain phase regulator 18, and is delivered from the speaker 6. A detection signal of a talking microphone 10 is sent to a talking signal output terminal 12.

In such conventional noise controlled handset, however, when talking in a noise environment, since the noise and the talker's voice are controlled alike, the talker is hard to hear his or her own voice, and further noise mixes into the talking microphone, and the partner of communication is also hard to hear, and natural talk was difficult in two-way communication.

SUMMARY OF THE INVENTION

It is hence an object of the invention to present a noise controlled handset allowing the talker to hear his or her own voice even in a noisy environment, and having small effect of noise on the partner of communication.

A noise controlled type handset of the present invention 1 comprises:

noise detecting means installed on the handset for detecting noise, a talking microphone installed near the mouth position of the handset, a speaker installed near the ear position of the handset, first filter means connected to the noise detecting means, first adding/subtracting means for adding or subtracting by using output of the talking microphone and output of the first filter means, and sending out the result to a talking signal output terminal, error detecting means installed near the ear position of the handset for detecting output of the speaker and the noise, second filter means connected to the noise detecting means, and second adding/subtracting means for adding or subtracting by using output of the second filter means and receiving signal, and sending out the result to the speaker, wherein the first filter means receives the detected noise, and coefficient of the first filter means is updated by using the added or subtracted result, and the second filter means receives the detected noise, and coefficient of the second filter means is updated by using the output of the error detecting means.

A noise controlled type handset of the present invention 2 according to said invention 1, wherein the noise detecting means is provided at the back side of the speaker.

A noise controlled type handset of the present invention 3 according to said invention 1, wherein the noise detecting means has non-directional characteristic and is provided near the talking microphone, and the talking microphone has a maximum sensitivity substantially of bidirectional characteristic in the direction of the talker's mouth position.

A noise controlled type handset of the present invention 4 according to said invention 1 or 3, further comprises:

first voice detecting means for detecting a voice signal from the output signal of the talking microphone, wherein the coefficient of the first filter means and/or the coefficient of the second filter means are not updated when the first voice detecting means has detected the voice signal.

A noise controlled type handset of the present invention 5 according to said invention 1 or 3, further comprises:

second voice detecting means for detecting a voice signal from output receiving signal, wherein the coefficient of the second filter means is not updated when the second voice detecting means has detected the voice signal.

A noise controlled type handset of the present invention 6 according to said invention 3, wherein the handset is a headphone type handset, and the speaker, the error detecting means, the second filter means, and the second adding/subtracting means are provided by two sets each.

A noise controlled type handset of the present invention 7 according to said invention 1, wherein the handset is a headphone type handset, and the noise detecting means, the speaker, the error detecting means, the first and second filter means, and the first and second adding/subtracting means are provided by two sets each.

A noise controlled type handset of the present invention 8 according to said invention 7, further comprises:

third filter means for the right side connected to left noise detecting means of the two sets of noise detecting means, and third filter means for the left side connected to right noise detecting means of the two sets of noise detecting means, wherein the third filter means for the right side makes use of output of right error detecting means of the two sets of error detecting means, and updates the coefficient of the third filter means for the right side, the output of the third filter means for the right side, and the output of the second adding/subtracting means for the right side of the two sets of second adding/subtracting means are added or subtracted, and put into the right speaker of the two sets of speaker, the third filter means for the left side makes use of output of left error detecting means of the two sets of error detecting means, and updates the coefficient of the third filter means for the left side, and the output of the third filter means for the left side, and the output of the second adding/subtracting means for the left side of the two sets of second adding/ subtracting means are added or subtracted, and put into the left speaker of the two sets of speaker.

A noise controlled type handset of the present invention 9 comprises:

noise detecting means installed on the handset for detecting noise, a talking microphone installed near the mouth position of the handset, a speaker installed near the ear position of the handset, first filter means connected to the noise detecting means, first adding/subtracting means for adding or subtracting by using the output of the talking microphone and the output of the first filter means, and sending out the result to a talking signal output terminal, and voice detecting means for detecting a voice signal from the output signal from the talking microphone, wherein the first filter means receives the detected noise, and coefficient of the first filter means is updated by using the added or subtracted result, and the coefficient of the first filter means is not updated when the voice detecting means has detected the voice signal.

A noise controlled type handset of the present invention 10 comprises:

noise detecting means installed on the handset for detecting noise, a talking microphone installed near the mouth position of the handset, a speaker installed near the ear position of the handset, first filter means connected to the noise detecting means, and first adding/subtracting means for adding or subtracting by using the output of the talking microphone and the output of the first filter means, and sending out the result to a talking signal output terminal, wherein the noise detecting means has a non-directional characteristic and is provided near the talking microphone, the talking microphone has a maximum sensitivity substantially of bidirectional characteristic in the direction of the talker's mouth position, and the first filter means receives the detected noise, and coefficient of the first filter means is updated by using the added or subtracted result.

A noise controlled type handset of the present invention 11 according to said invention 10, further comprises:

first voice detecting means for detecting a voice signal from the output signal of the talking microphone, wherein the coefficient of the first filter means is not updated when the first voice detecting means has detected the voice signal.

A noise controlled type handset of the present invention 12 according to said invention 10, wherein the handset is a headphone type handset, and the speaker, and the error detecting means are provided by two sets each.

A noise controlled type handset of the present invention 13 comprises:

a plurality of noise detectors for detecting noise, a head gear of cap shape, helmet shape or antenna shape fixing all or part of noise detectors of the plurality of noise detectors, a first filter group having a plurality of first filters for receiving the output signals of the noise detectors, a second filter group having a plurality of second filters for receiving the output signals of the noise detectors, a talking microphone installed near the mouth position of the handset, a speaker installed near the ear position of the handset, and an error detector installed near the ear position of the handset, wherein each output signal of the first filters is subtracted from the output signal of the talking microphone, each coefficient of the first filters is updated by using this subtraction signal, the subtraction signal is sent out into a talking signal output terminal, each coefficient of the second filters is updated by making use of output signal of the error detector, output signals of the second filter group, the subtraction signal, and the receiving signal from a receiving signal input terminal are added, and the sum signal is put into the speaker.

A noise controlled type handset of the present invention 14 according to any one of said inventions 1 to 13, wherein the signal to be sent out into the talking signal output terminal is also substantially sent out into the speaker.

BRIEF DESCRIPTION OF THE DRAWINGS

FIG. 8 is a block diagram of a fourth embodiment of the invention.

DETAILED DESCRIPTION OF PREFERRED EMBODIMENTS

Figure 1A:
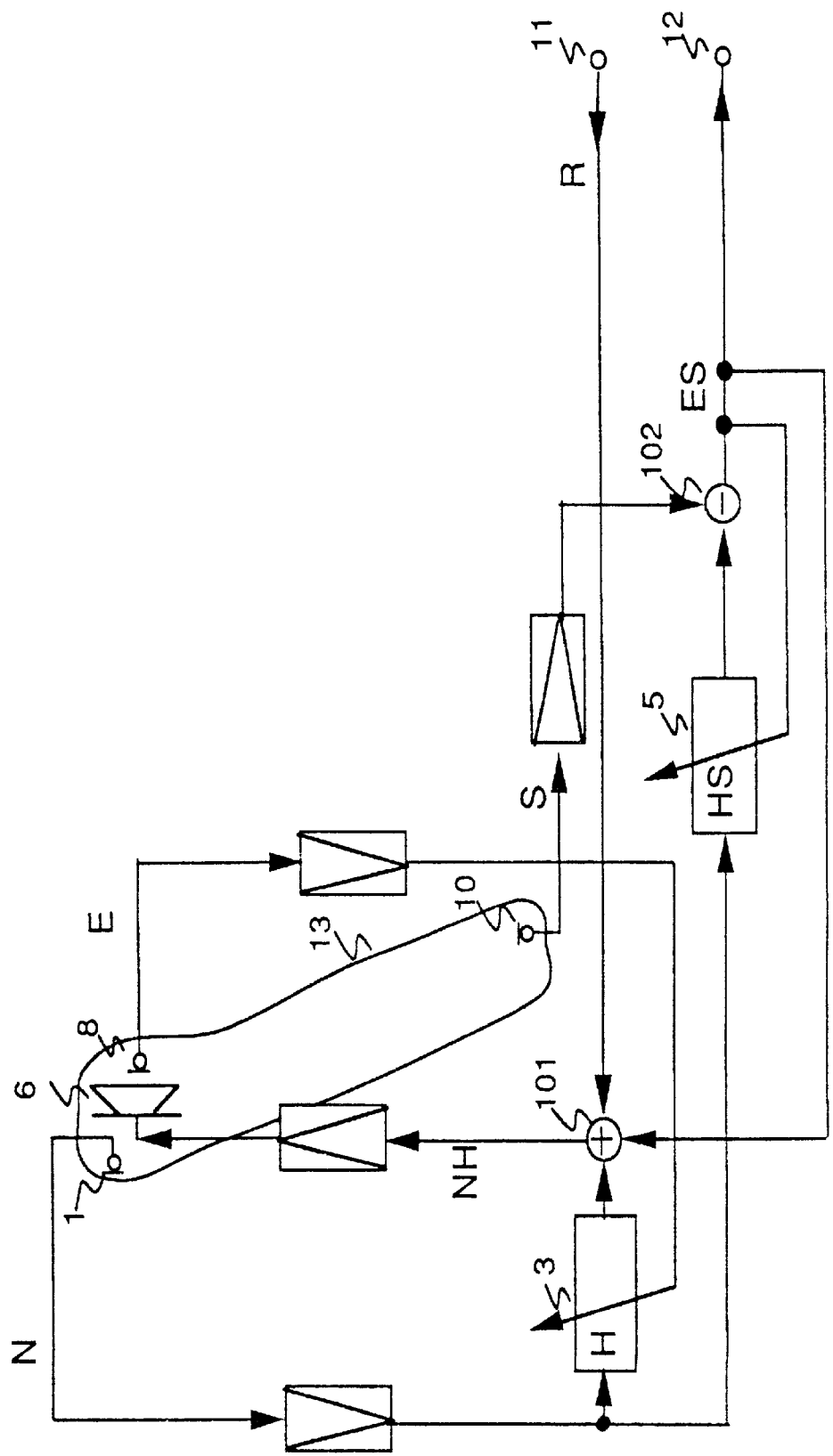
FIG. 1A is a block diagram of a first embodiment of the invention.
Figure 1B:
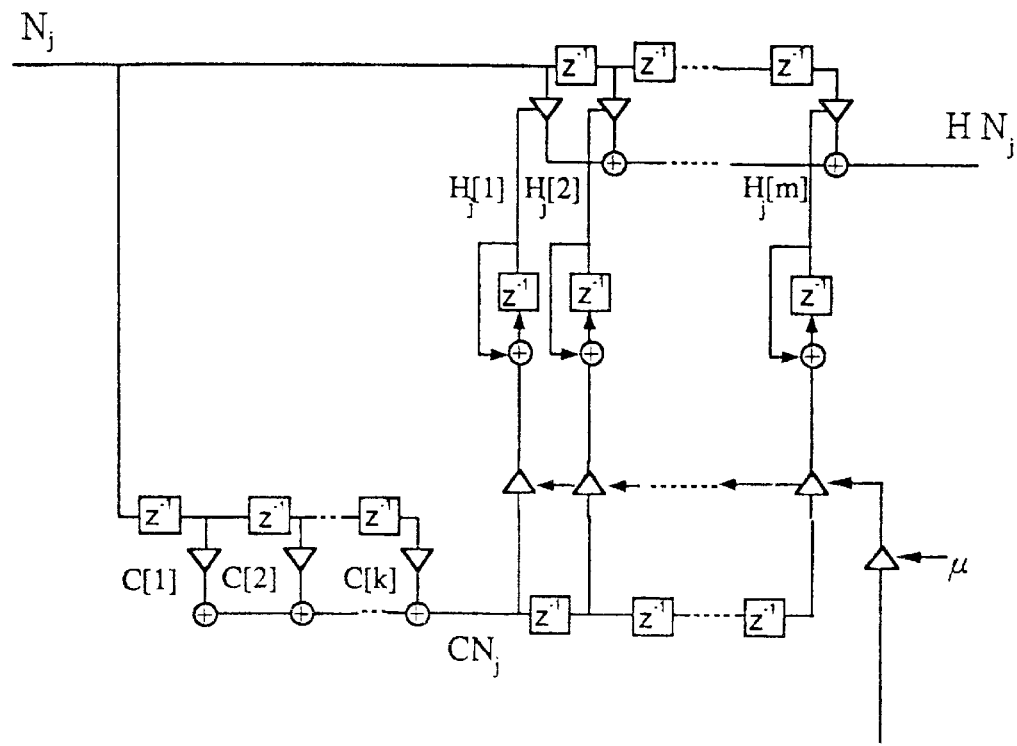
FIG. 1B is a block diagram of a first adaptive filter in the first embodiment of the invention.

A first embodiment of the invention is described below while referring to FIG. 1A. It is a feature of this embodiment that the noise mixing in the talking microphone is reduced to improve the articulation of talk-back to the voice to the talker and speech sound to the communication partner, and it is other feature to lower the noise near the earphone to prevent noise from getting into the ear. In FIG. 1A, reference numeral 1 is a noise detector, 3, 5 are adaptive filters, 6 is a control speaker, 8 is an error detector, 10 is a talking microphone, 11 is a receiving signal input terminal, 12 is a talking signal output terminal, and 13 is a handset. The noise detector 1 is installed in the outer wall of the handset, and detects the incoming noise. The adaptive filter 3 (corresponding to second filter means) is composed, for example, as shown in FIG. 1B, and it processes noise detection signal N, and sends a control output NH to the control speaker 6. This control sound is combined with the noise invading from outside of the handset, and the error sound is detected by the error detector 8, and coefficients H[1], H[2], . . . , and H[m] in FIG. 1B are updated according to formula (1) so as to decrease the error detection signal E.

That is, supposing the signal of noise detector 1 at time j to be $N_j$, signal of error detector to be $E_j$, coefficient of adaptive filter 3 to be $H_j[m]$, and transmission function of error detector 8 from control speaker 6 to be C, coefficient $H_{j+1}[m]$ of adaptive filter 3 at time j+1 is $$H_{j+1}[m]=H_j[m]+\mu E_j CN_j \quad (1)$$

where $\mu$ is a constant, which is a sufficiently smaller value than 1 such as 0.0001.

As a result, the noise near the ear is reduced.

In this case, the talker's voice is hardly detected in the noise detector 1, and hence the coefficient is not updated according to formula (1) by the talker's voice. Therefore, one's own voice is not absorbed by the control sound.

Figure 1C:
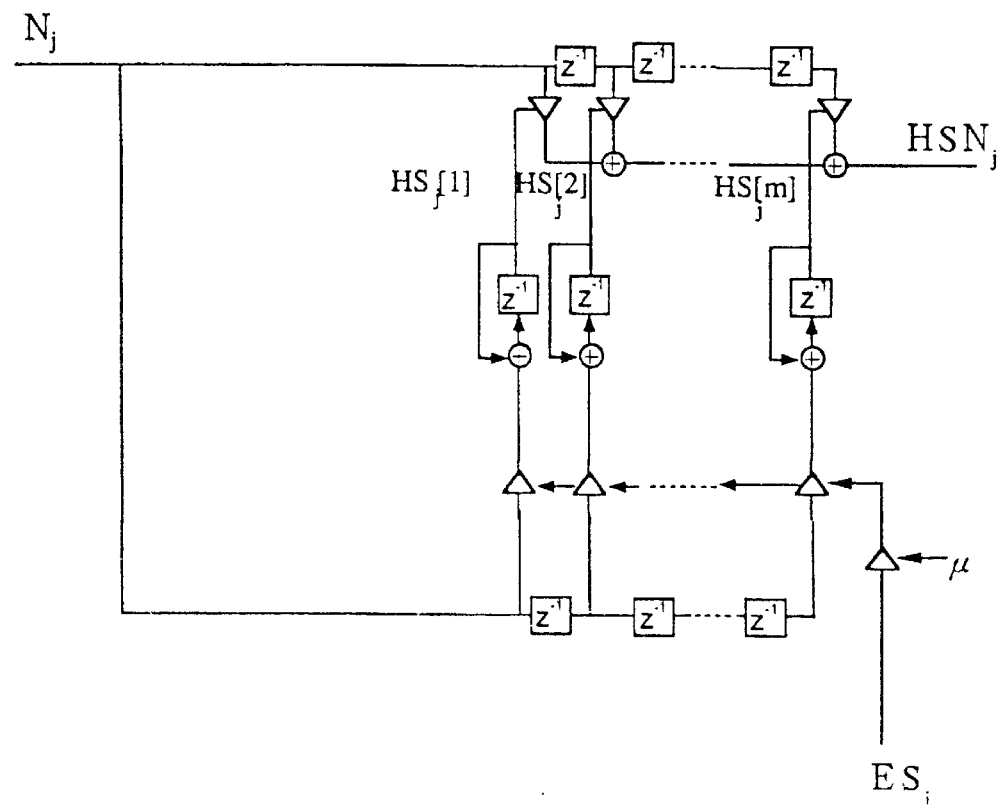
FIG. 1C is a block diagram of a second adaptive filter in the first embodiment of the invention.

Consequently, the noise detection signal N is also fed into the adaptive filter 5 (corresponding to first filter means). The adaptive filter 5 is composed, for example, as shown in FIG. 1C. And its processing output signal is subtracted from the detection signal S of the talking microphone 10 by a substracter 102 (corresponding to first adding/subtracting means). By this subtraction signal ES, the coefficient HS of the adaptive filter 5 is updated so that this subtraction signal ES may be smaller. This updating conforms to formula (2). That is, supposing the signal of noise detector 1 at time j to be $N_j$, subtraction signal to be ES, and coefficient of adaptive filter 5 to be $HS_j[m]$, the coefficient $HS_{j+1}[m]$ of adaptive filter 5 at time j+1 is $$HS_{j+1}[m]=HS_j[m]+\mu ES_j N_j \quad (2)$$

Hence, the noise contained in the talking signal S is decreased.

In this case, the talker's voice detected by the talking microphone 10 is hardly detected in the noise detector 1, and hence the coefficient is not updated according to formula (2), but it is directly sent out to the subtraction signal ES. This signal is added to the control output signal of the adaptive filter 3 by a adder 101 (corresponding to second adding/subtracting means), and its addition signal is delivered to the control speaker 6 so that the noise is reduced for the talker and that the voice is clearly heard by the talker himself or herself.

Moreover, by sending this subtraction signal ES as the talking signal, the partner of communication can hear the speech reduced in noise. Therefore, in a noisy environment, by mutually using the apparatus of the embodiment, the voice of the talker and the partner can be heard clearly without being interfered by noise, so that spontaneous talk is realized.

Figure 2:
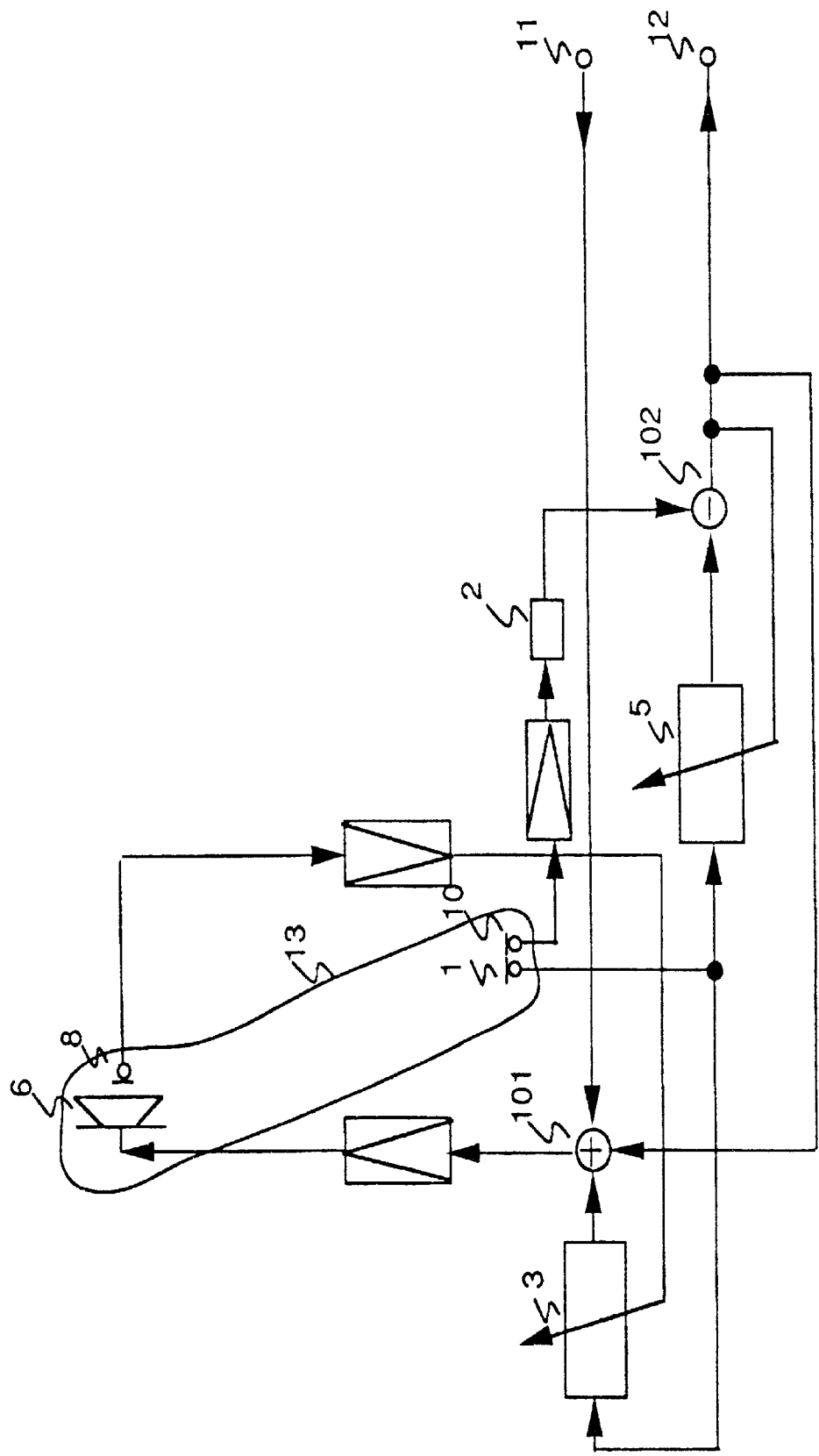
FIG. 2 is a block diagram of a second embodiment of the invention.
Figure 3:
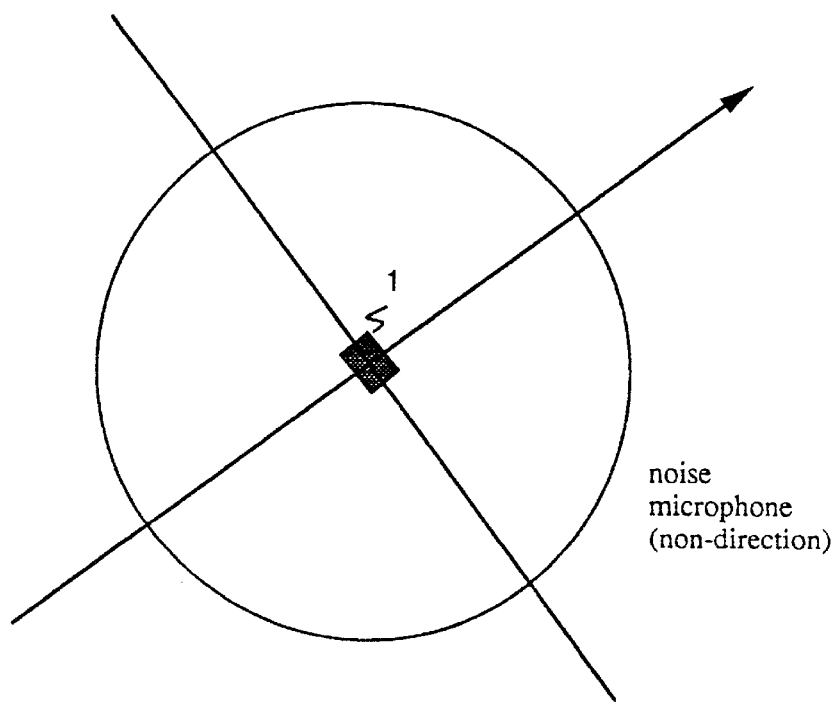
FIG. 3 is a directivity characteristic diagram of a noise detector in the second embodiment of the invention.
Figure 4:
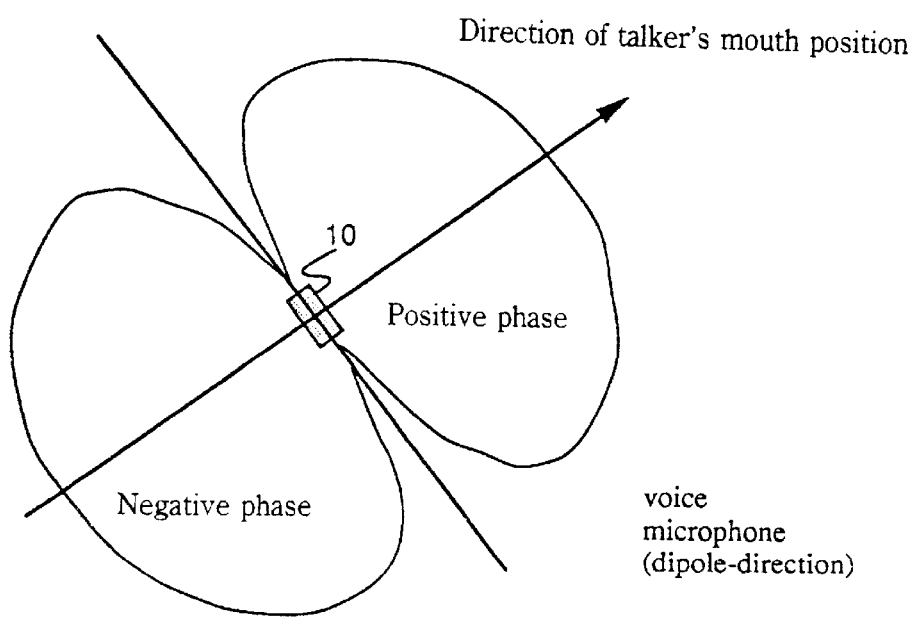
FIG. 4 is a directivity characteristic diagram of a talking microphone in the second embodiment of the invention.
Figure 5:
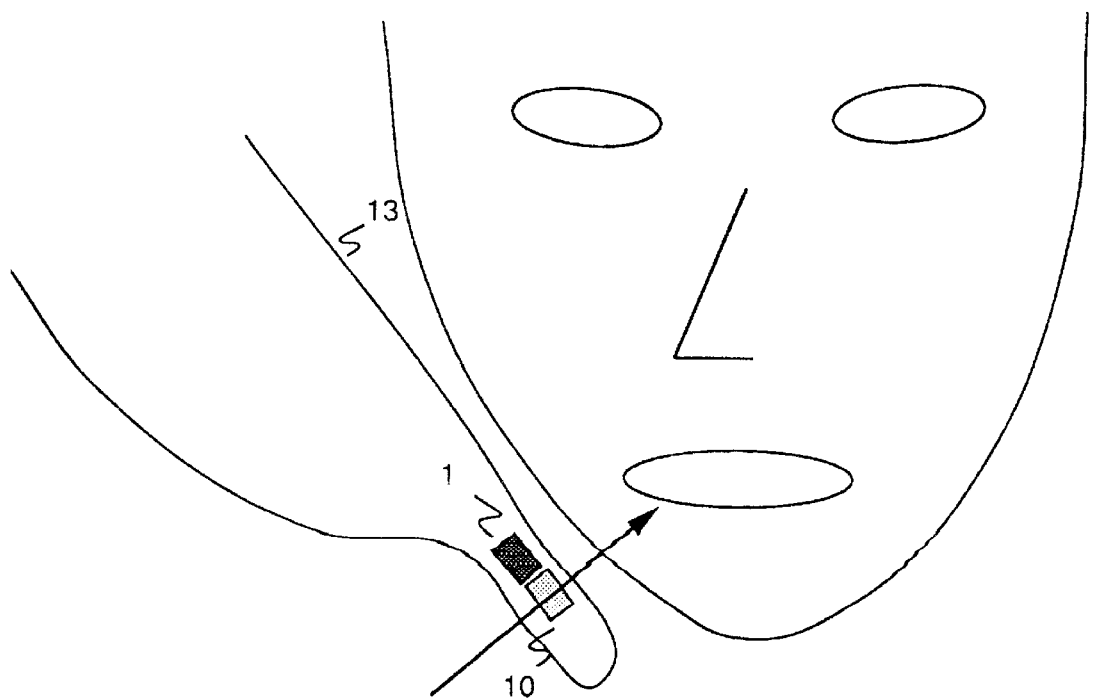
FIG. 5 is a layout diagram of noise detector and talking microphone in the second embodiment of the invention.

A second embodiment of the invention is described below while referring to FIG. 2. In the embodiment, in addition to the effects of the first embodiment, it is a feature that the residual noise of the subtraction signal can be reduced. In FIG. 2, reference numeral 2 is delay circuit. The directivity of the noise detector 1 is non-directional as shown in FIG. 3, and it is installed near the talking microphone 10. The directivity of the talking microphone 10 is bi-directional as shown in FIG. 4, and the direction for obtaining a voice-voltage conversion output in positive phase is toward the mouth as shown in FIG. 5. Other constitution is same as in the first embodiment. In this constitution, first, by installing the noise detector 1 near the talking microphone 10, the correlation between the output signal of the noise detector 1 and the noise component of the detection signal of the talking microphone 10 is heightened, and further by delaying the talking signal for a specific time by the delay circuit 2, there is an allowance in the operation time of the adaptive filter 5, so that the noise component in the talking signal can be decreased at high precision.

Figure 6:
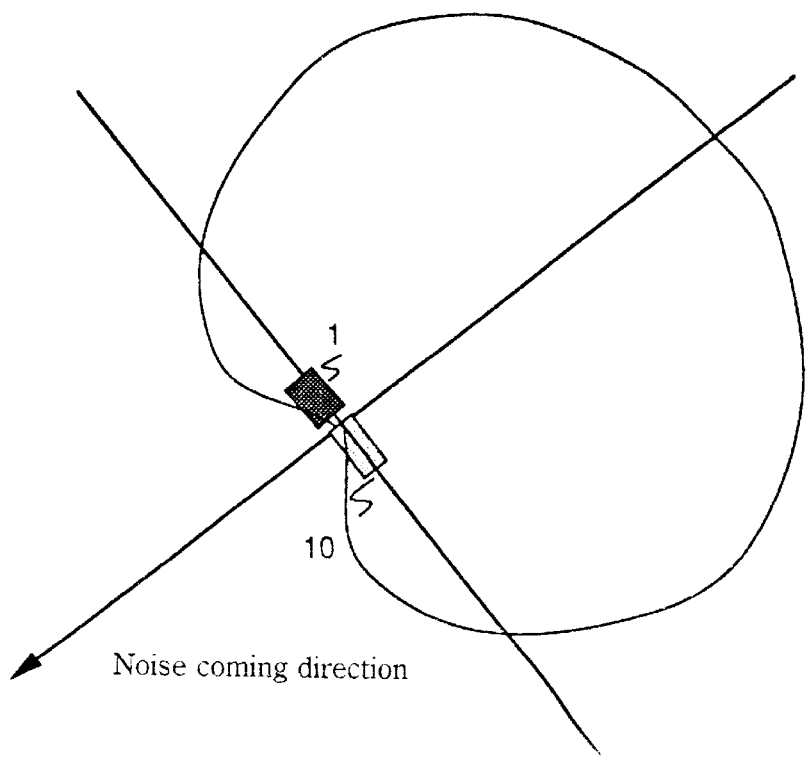
FIG. 6 is a directivity characteristic diagram of a subtraction signal in the second embodiment of the invention.

Moreover, by the non-directional property of the noise detector 1 and bidirectional property of the talking microphone 10, as the combined directivity of the subtraction signal, a directivity having a bottom in the noise coming direction is obtained as shown in FIG. 6, and the sensitivity can be lowered against the noise. In the embodiment, therefore, as compared with the first embodiment, the noise signal of the subtraction signal can be further reduced.

Figure 7A:
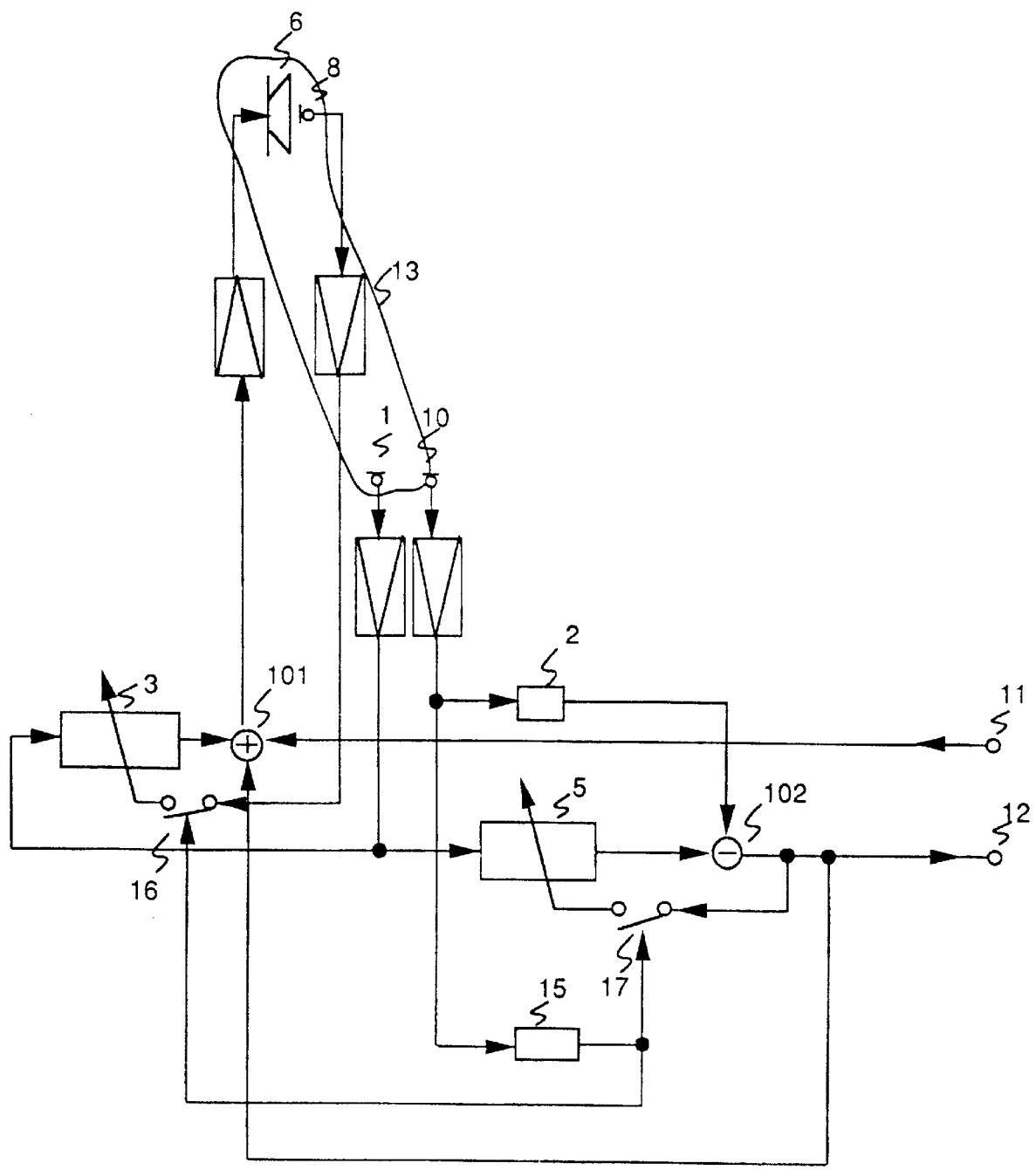
FIG. 7A is a block diagram of a third embodiment of the invention.
Figure 7B:
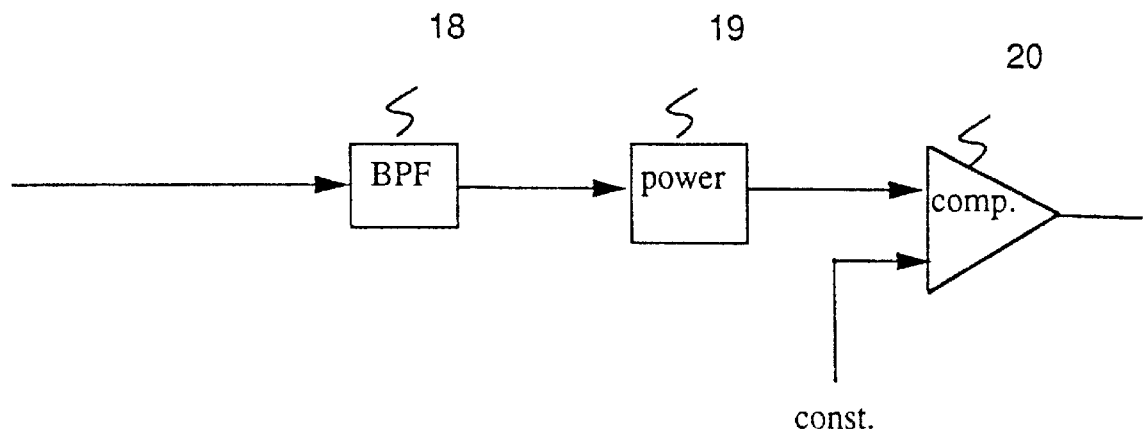
FIG. 7B is a block diagram of a voice detector in the third embodiment of the invention.
Figure 7C:
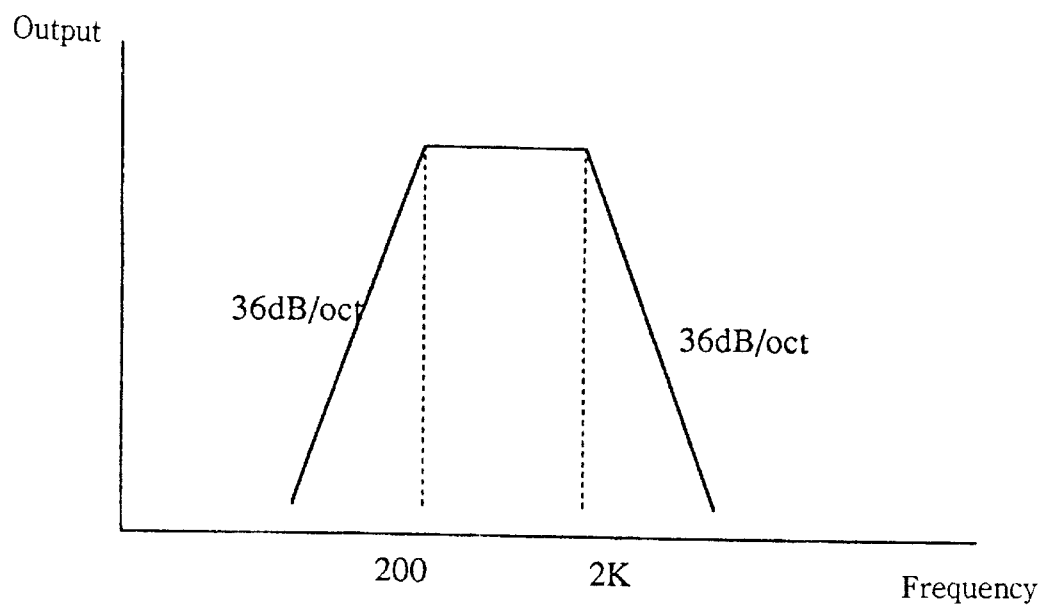
FIG. 7C is a frequency characteristic diagram of a band pass filter of the voice detector in the third embodiment of the invention.

A third embodiment of the invention is described next by referring to FIG. 7A. The embodiment, in addition to the effects of the second embodiment, has a feature of enhancing further the articulation of a voice signal in the subtraction signal. In FIG. 7A, reference numeral 15 is a voice detector, and 16, 17 are switches. The other constitution is same as in the second embodiment. In this constitution, the voice detector 15 first detects if there is voice signal or not in the output signal of the talking microphone, and if voice is present, a detection signal is issued. FIG. 7B shows an example of the voice detector. In FIG. 7B, the talking microphone signal passes through a band pass filter BPF 18 of the voice signal band, and is squared by a square integrating device 19, and the integrated power of every, for example, 10 msec is calculated. An example of frequency characteristic of the BPF 18 is shown in FIG. 7C. This integrated power signal is put into a comparator and compared with a set value, and when the integrated power exceeds the set value, voice is detected. This voice detection output controls the switch 16 and the switch 17, and respectively cuts off the error input signal of the adaptive filter 3 and the adaptive filter 5, and the coefficient updating operation of the adaptive filters 3, 5 is stopped. Accordingly, usually, when voice is not detected, the adaptive filters 3, 5 update the coefficients by the noise signal, thereby controlling and decreasing the noise and noise signal in the talking microphone, and when voice is detected, this operation is stopped temporarily, so that malfunction of the adaptive filters by voice can be avoided. Hence, adverse effects such as silencing of voice signal can be eliminated, and clear voice communication is realized.

Figure 7D:
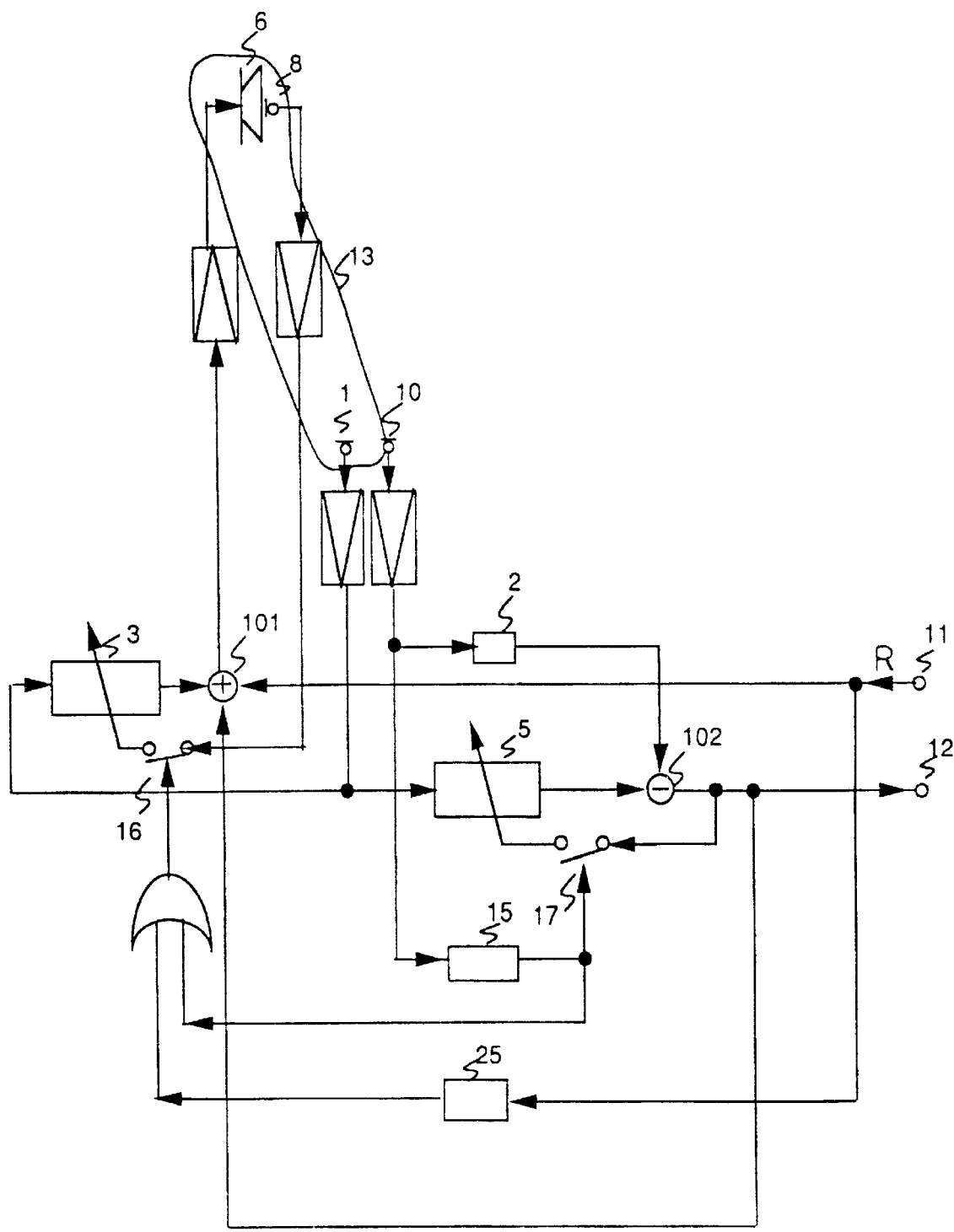
FIG. 7D is other block diagram of the third embodiment of the invention.

In the embodiment, by further adding a voice detector 25 of reception signal R as shown in FIG. 7D, the coefficient updating of the adaptive filter 3 is also controlled by the reception signal.

A fourth embodiment of the invention is described by reference to FIG. 8. In this embodiment, the second embodiment is applied in a headset. This embodiment, in addition to the features of the second embodiment, has a feature that only one noise detector is needed for controlling independent speakers of right and left channels of the headset, and also a feature that the noise near the ear can be reduced further. In FIG. 8, reference numerals 3, 4, 5 are adaptive filters, 6, 7 are control speakers, 8, 9 are error detectors, and 14 is a headset. In this constitution, the noise detector 1 can be used commonly in right and left channels. As compared with the constitution of using right and left noise detectors, one noise detector can be saved. Moreover, by installing the noise detector 1 near the talking microphone before the mouth, the distance to the control speaker in the headset can be set longer, and as a result there is an allowance in the operation time of the adaptive filters 3 and 4, and the noise of both channels can be decreased at high precision. Other actions and effects are same as in the second embodiment. The second filter means for the left side and the second filter means for the right side of the invention correspond to the adaptive filters 3 and 4, respectively. Of the two sets of the speakers of the invention, the left speaker and right speaker correspond to the speakers 6 and 7, respectively. Of the two sets of the error detecting means of the invention, the left error detecting means and right error detecting means correspond to the error detectors 8 and 9, respectively.

Figure 9A:
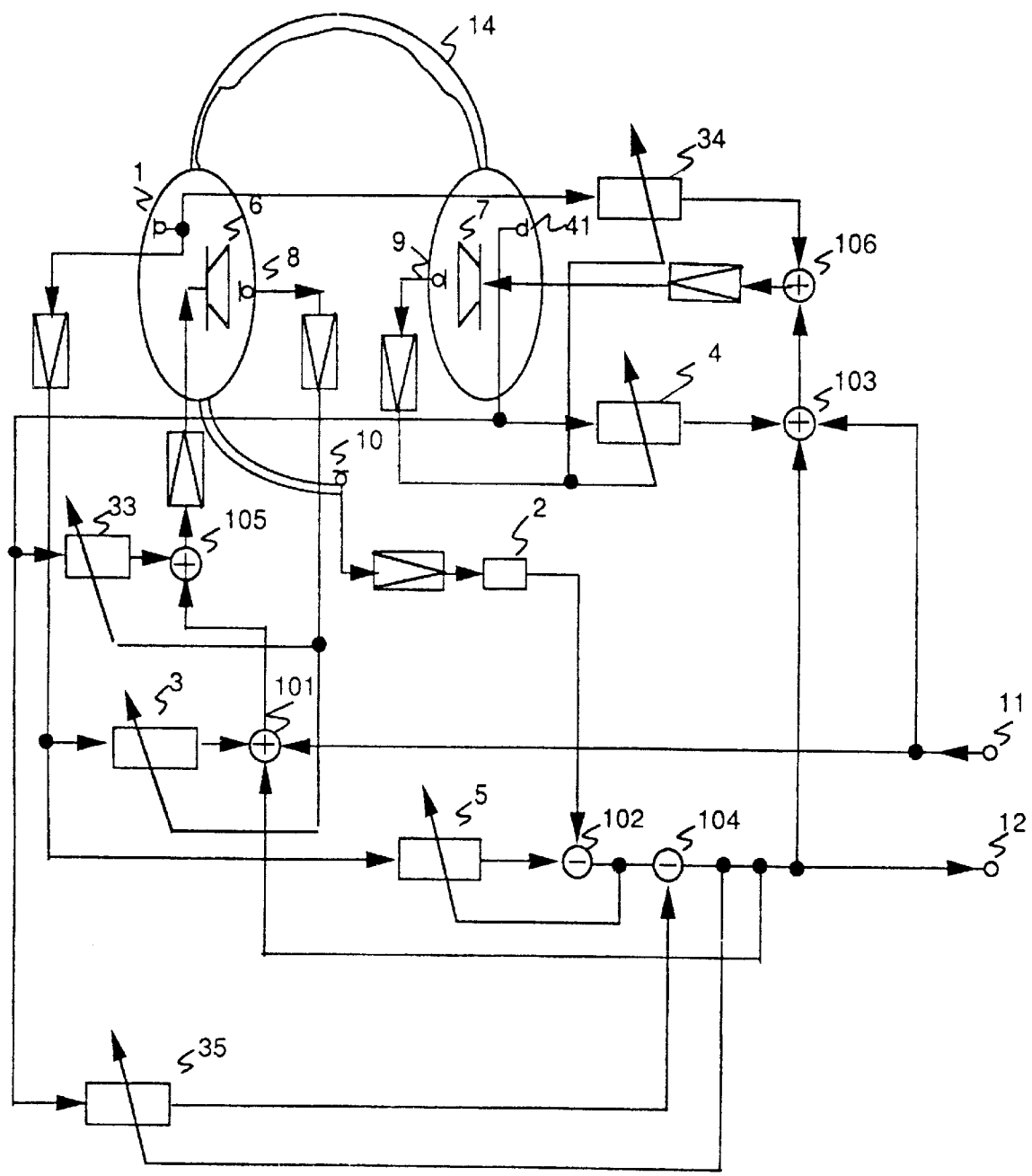
FIG. 9A is a block diagram of a fifth embodiment of the invention.

A fifth embodiment of the invention is described while referring to FIG. 9A. In this embodiment, the noise detector in the fourth embodiment is installed outside of the headset by two pieces for both channels, and their output signals are processed by two adaptive filters. It is a feature of this embodiment that the noise from the side can be decreased more near the ear by using two independent noise detectors. In FIG. 9A, reference numerals 1 and 41 are noise detectors, 4, 3, 5, 33, 34, and 35 are adaptive filters.

The first filter means for the left side and the first filter means for the right side of the invention correspond to the adaptive filters 5 and 35, respectively. Of the two sets of noise detecting means of the invention, the right noise detecting means and left noise detecting means correspond to the noise detectors 1 and 41, respectively. The first adding/subtracting means for the left side and the first adding/subtracting means for the right side of the invention correspond to the subtracters 102 and 104, respectively. The second adding/subtracting means for the left side and the second adding/subtracting means for the right side of the invention correspond to the adders 101 and 103, respectively. Other constituent elements are same as in the fourth embodiment. In this constitution, for example, the output signal of the noise detector 1 is inputted not only into the adaptive filters 3 and 5, but also into the adaptive filter 34, and the processing output is added to the processing output of the adaptive filter 4 for processing the output of the noise detector 41 by adder 103 and 106, and the sum is put into the control speaker 7. As a result, the noise from both right and left side can be precisely controlled and reduced by the control sound of the control speaker 7. Similarly, the output signal of the noise detector 41 is processed similarly, and the noise from right and left side can be precisely controlled and decreased by the control sound of the control speaker 6. Moreover, as for noise signal mixing in the talking microphone, by subtracting the control signal by the adaptive filter 5 and adaptive filter 35, the noise signal left over in the subtraction signal can be decreased more than in the case of using one noise detector.

Figure 9B:
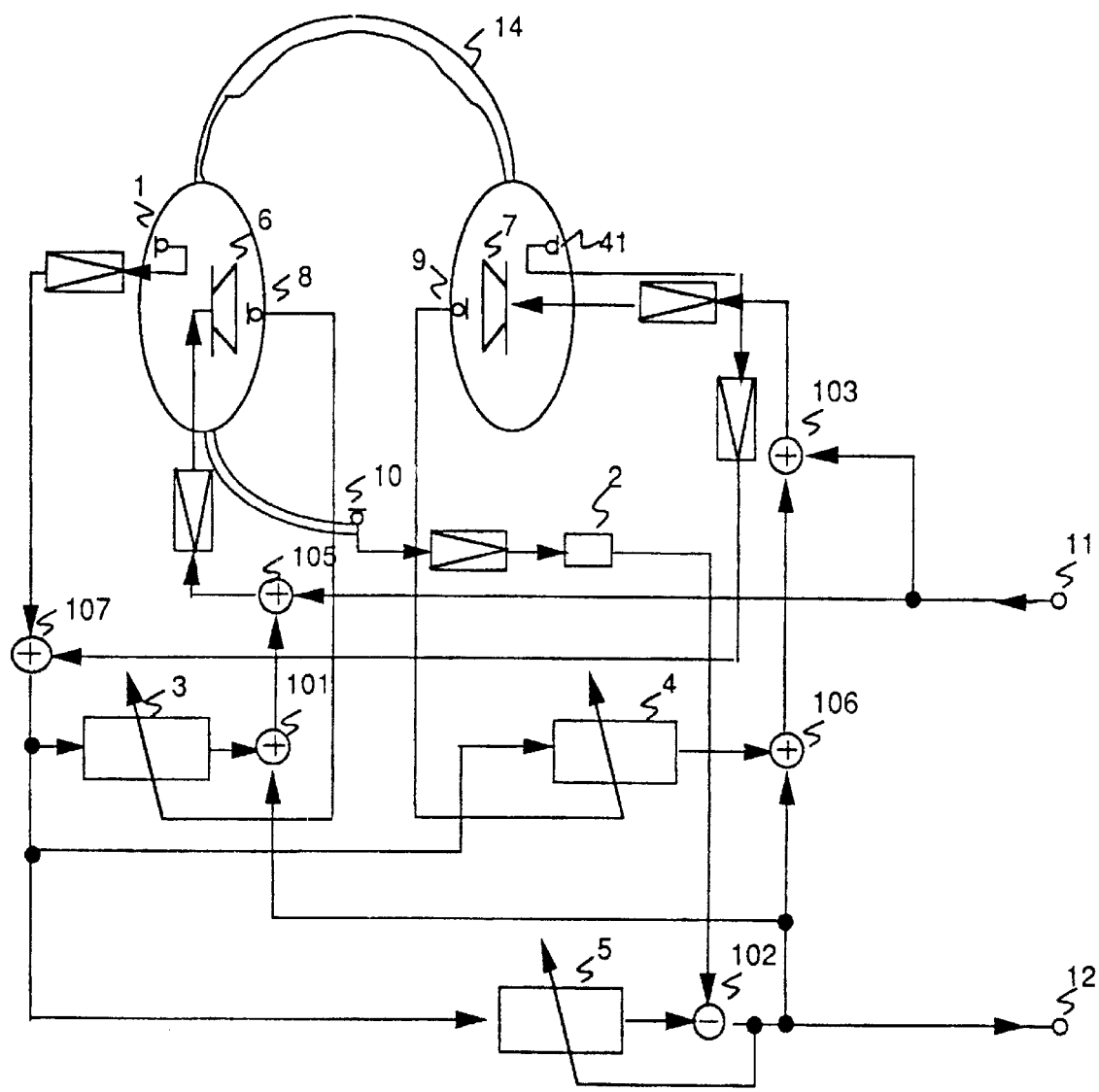
FIG. 9B is a block diagram of a sixth embodiment of the invention.

A sixth embodiment of the invention is described by referring to FIG. 9B. In this embodiment, the signal summing up the output signals of the noise detectors 1 and 41 in the fifth embodiment is inputted into the adaptive filters 3, 4, 5. The other constitution is same as in the fourth embodiment. In this embodiment, by installing two independent noise detectors, the noise from the side can be decreased more effectively near the ear, and the number of adaptive filters is decreased and the device size can be reduced. In FIG. 9E, since the output signal of the noise detector closer to the noise source is usually large, and by using the sum signal of the output signal of the noise detector 1 and the output signal of the noise detector 41 as a comprehensive noise detection signal, the signal from the noise detector closer to the noise source is dominant in the sum signal, and same as in the fifth embodiment, the noise from both sides can be controlled at high precision, while the device scale is reduced as compared with the constitution of installing independent adaptive filters.

Figure 10:
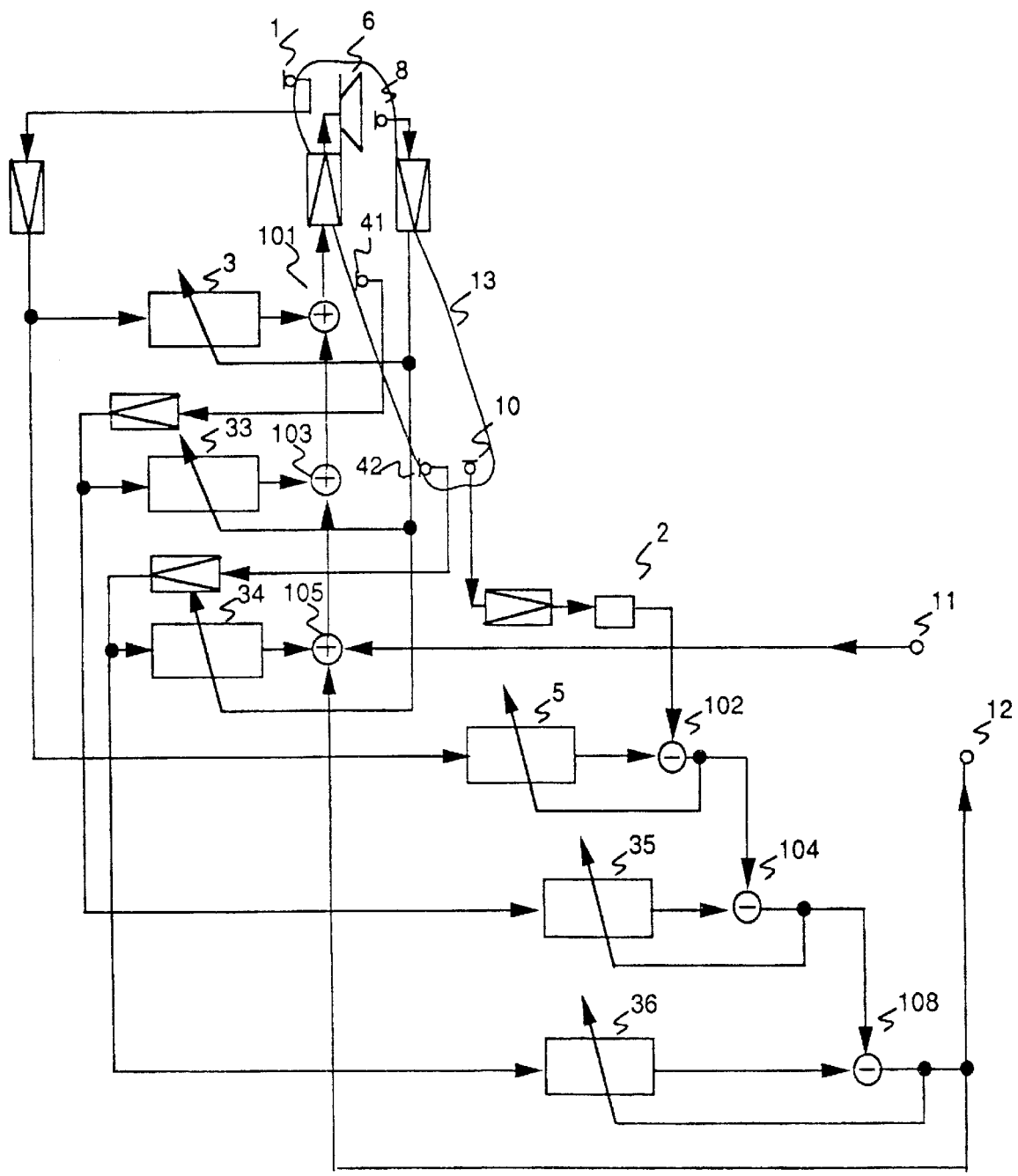
FIG. 10 is a block diagram of a seventh embodiment of the invention.

A seventh embodiment of the invention is described by reference to FIG. 10. In this embodiment, three noise detectors of the first embodiment are installed outside the handset, and the individual output signals are processed by three adaptive filters. It is a feature of this embodiment that the noise from the side is decreased more effectively near the ear by using three independent noise detectors. In the diagram, reference numerals 1, 41, 42 are noise detectors, and 33, 34, 35, 36 are adaptive filters. The other constituent elements are same as in the first embodiment. In this constitution, the output signal of the noise detector 1 is not only processed in the adaptive filter, but also the outputs of the noise detector 41 and the noise detector 42 are processed by the adaptive filter 33 and the adaptive filter 34, and the outputs of the adaptive filters are summed up and applied to the control speaker 6. As a result, incoming noise from plural directions can be controlled and reduced effectively by the control sound of the control speaker 6. Hence, noise from any direction can be controlled and reduced effectively. As for the noise mixing into the talking microphone 10, the residual noise signal can be reduced effectively by subtracting the control outputs of the adaptive filters 5, 3, 36 from the output signal of the delay circuit 2.

Of course, by installing an arbitrary number of noise detectors, same effects as in this embodiment can be obtained.

Figure 11:
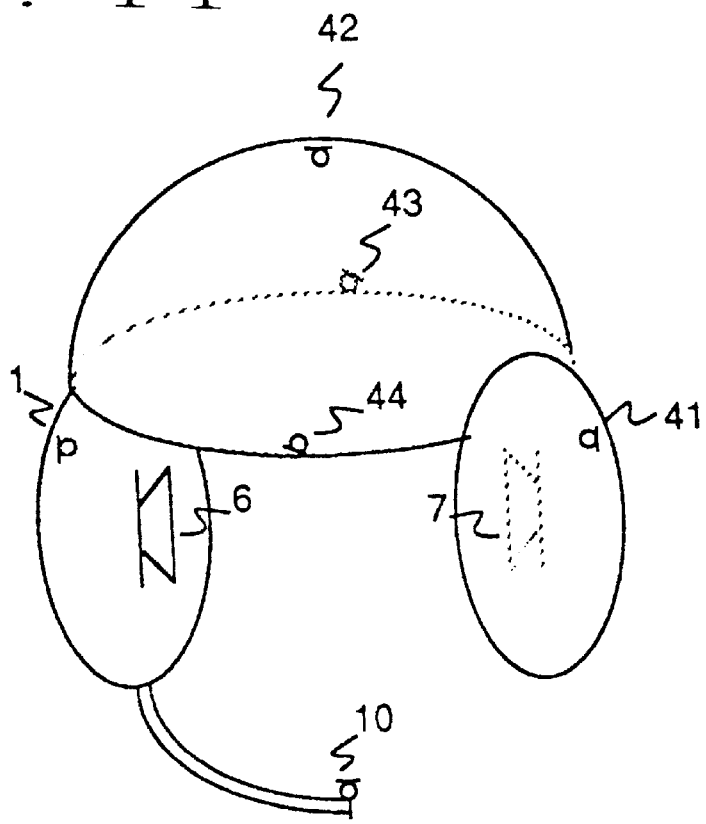
FIG. 11 is an appearance diagram of an eighth embodiment of the invention.
Figure 12:
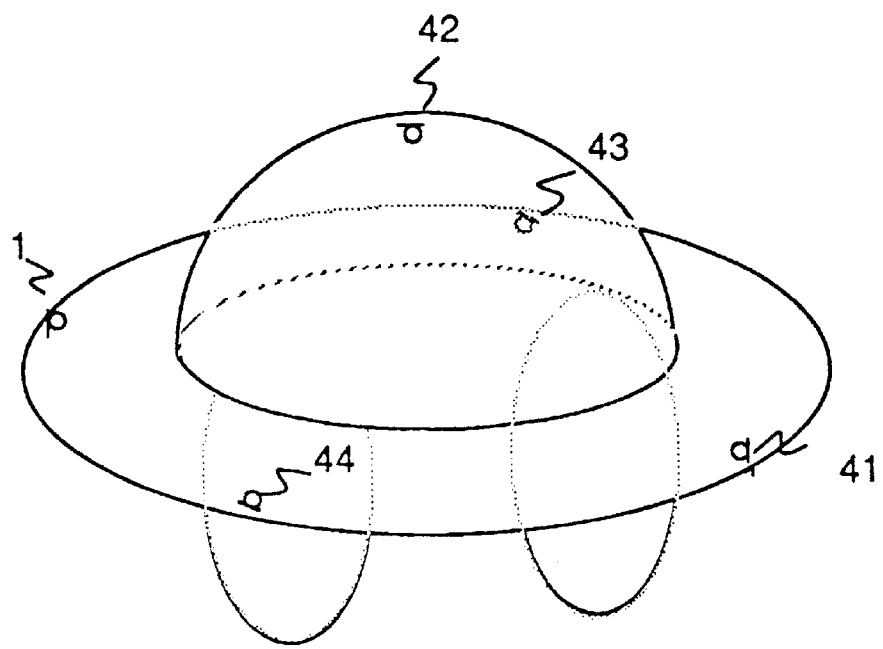
FIG. 12 is other appearance diagram of the eighth embodiment of the invention.
Figure 13:
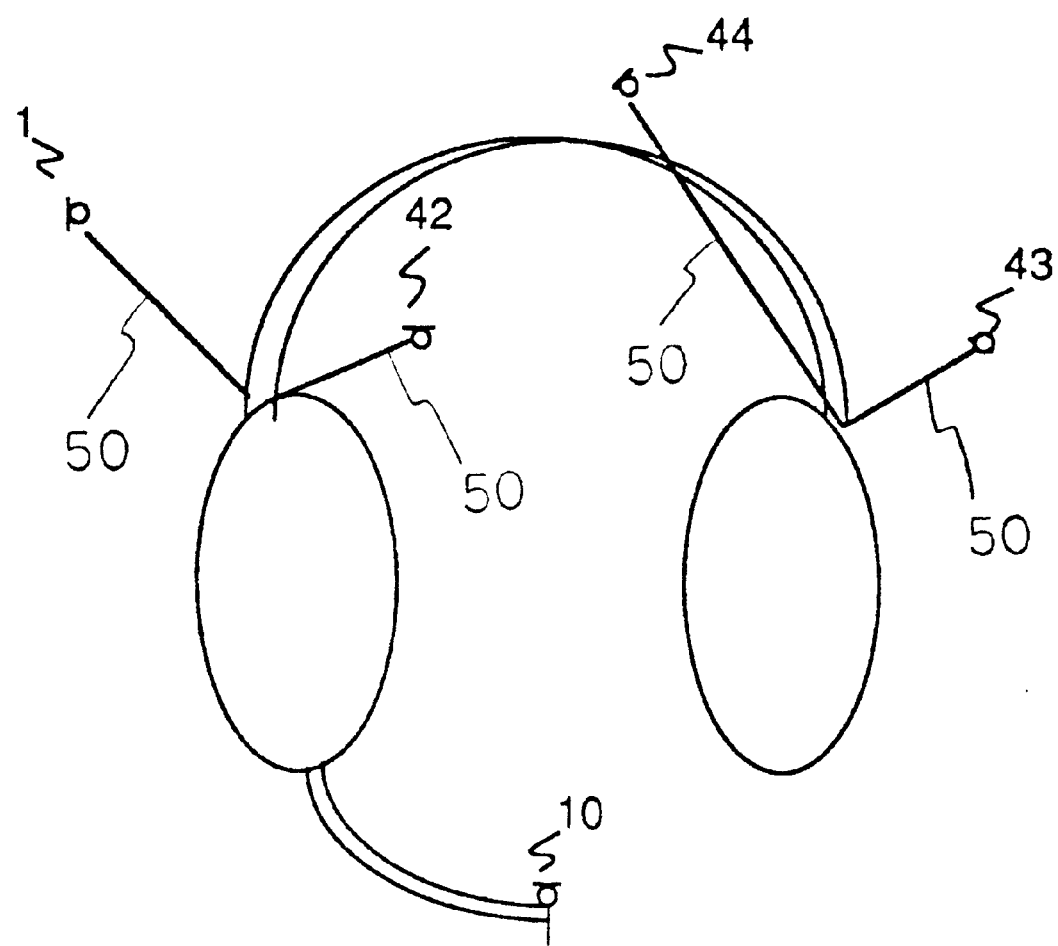
FIG. 13 is a different appearance diagram of the eighth embodiment of the invention.
Figure 14:
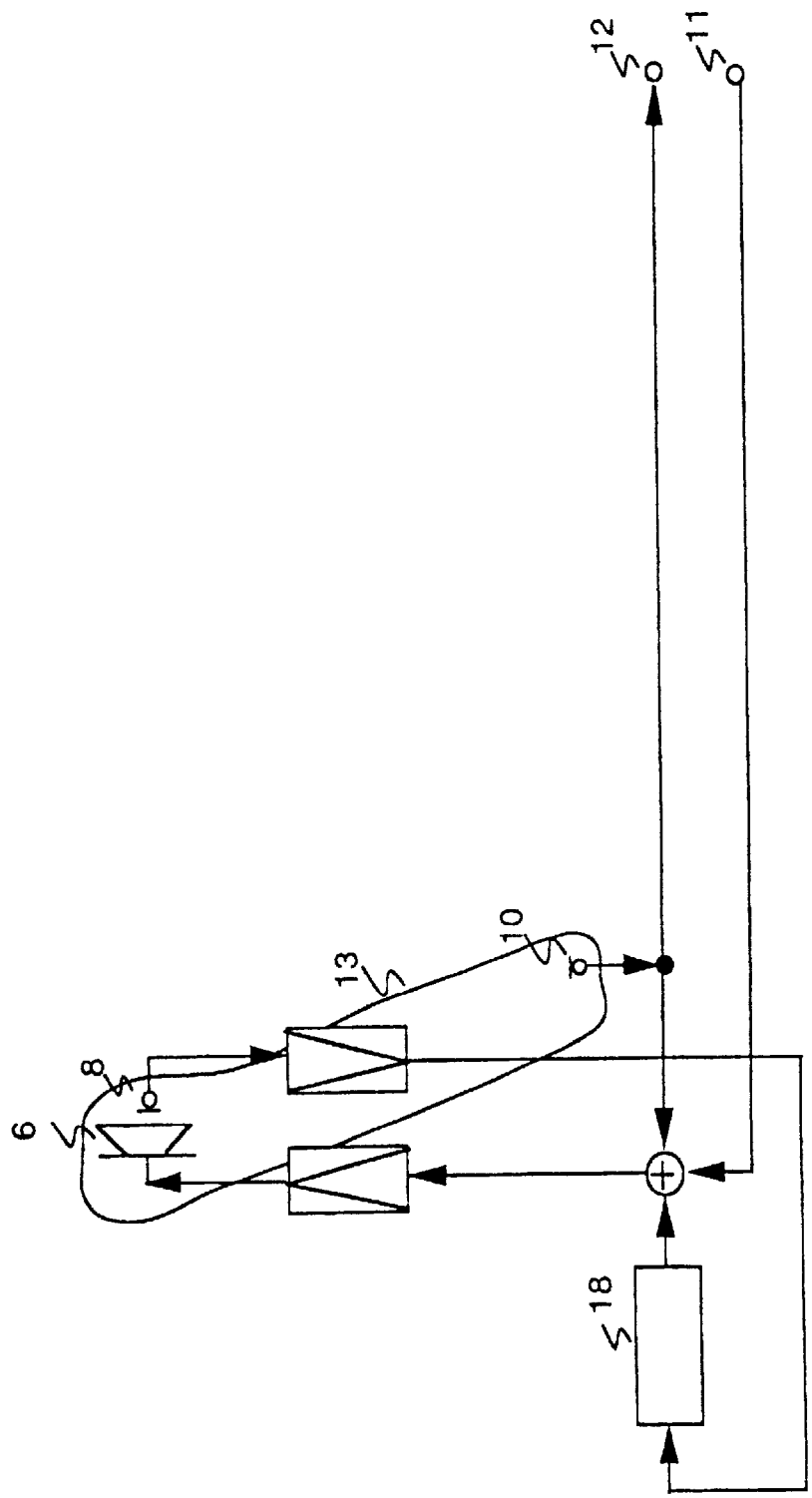
FIG. 14 is a block diagram of a conventional noise controlled handset.

An eighth embodiment of the invention is described by referring to FIG. 11. This embodiment refers to a case of mounting a headset on a cap-shaped head gear such as a helmet, showing a constitution in which the noise detectors in the fourth embodiment are installed in the outer wall of the head gear. FIG. 12 shows a constitution of installing the noise detectors at an end of brim of a hat-shaped head gear. In the drawings, reference numerals 43, 44 are noise detectors. Other constituent elements are same as in the fifth embodiment. The noise detectors 42, 43 shown in FIG. 12 act to detect upward and downward noise respectively, and hence noise from all direction can be controlled and reduced by the same processing as in the fourth embodiment. Furthermore, in FIG. 12, by installing the noise detectors 1, 41, 43, 44 at an end of brim of the head gear, the distance of the control speaker and noise detectors can be extended, and an allowance is provided in the operation time of the adaptive filter, and the precision of noise control is enhanced, and the noise can be reduced. The embodiment relates to the cap- or hat-shaped head gear, but the effects of the embodiment are also obtained by antenna 50, wire or other form not covering whole surface of the head as shown in FIG. 13.

In the foregoing embodiments, the first filter means and second filter means of the invention are explained as adaptive filter 5 and adaptive filter 3, and the noise controlled type headset having both filters is explained, but not limited to this, only one of the two filters may be used. For example, in a constitution having the adaptive filter 5 corresponding to the first filter means, it is effective to transmit the voice signal reduced in the surrounding noise mixing into the talking microphone to the partner of communication. In a constitution having the adaptive filter 3 corresponding to the second filter means, an output signal from the second filter means is also put into the speaker aside from the receiving signal, and the surrounding noise is suppressed, and it is easier to hear the receiving signal. At the same time, it is not hard to hear one's own voice.

In the embodiments, the output signal to the transmission signal output terminal is also put into the speaker, that is, talk-back is done, but not limited to this, talk-back may not be done.

Also in the embodiments, depending on the content of the output of the voice detector 15 connected to the talking microphone, it is controlled not to update the coefficients of both adaptive filter 3 (corresponding to second filter means) and adaptive filter 5 (corresponding to first filter means), but not limited to this, it may be controlled not to update the coefficient of either one adaptive filter.

Further in the embodiments, depending on the content of the output of the voice detector 15 connected to the talking microphone and the output of the voice detector 25 connected to the receiving signal input terminal, it is controlled not to update the coefficient of the adaptive filter, but not limited to this, for example, depending on the content of the output of the voice detector 25 connected to the receiving signal input means, that is, when the voice detector 24 detects the voice signal from the receiving signal, it may be controlled not to update the coefficient of the adaptive filter 3 (corresponding to second filter means).

The third filter means for the right side and the third filter means for the left side of the invention are explained respectively as the adaptive filter 34 and adaptive filter 33 in the foregoing embodiments, and the noise controlled type device having a headphone type transmitter/receiver comprising both filters is explained, but not limited to this, it may be composed by comprising either one of the two filters, or comprising none of them. In the constitution comprising none of the two filters, for example, the speaker and the error detecting means, and the second filter means and second adding/subtracting means (for example, corresponding to adder 101) are provided by two sets each, or the noise detecting means and speaker, error detecting means and first and second filter means, and first adding/subtracting means (for example, corresponding to subtracter 102) and second adding/subtracting means may be provided by two sets each. Herein, as shown in FIG. 9A, of the two sets of noise detecting means of the invention, the right noise detecting means and left noise detecting means correspond to the noise detectors 1 and 41, respectively. Of the two sets of the error detecting means of the invention, the left error detecting means and the right error detecting means correspond to the error detectors 8 and 9, respectively. Of the two sets of the speakers of the invention, the left speaker and right speaker correspond to the speakers 6 and 7, respectively. The first filter means for the left side and the first filter means for the right side of the invention correspond to the adaptive filters 5 and 35, respectively. The second filter means for the left side and the second filter means for the right side of the invention correspond to the adaptive filters 3 and 4, respectively. The first adding/subtracting means for the left side and the first adding/subtracting means for the right side of the invention correspond to the subtracters 102 and 104, respectively. The second adding/subtracting means for the left side and the second adding/subtracting means for the right side of the invention correspond to the adders 101 and 103, respectively.

What is claimed is:

1. A noise cancellation system having a mouth position and an ear position, and comprising:

noise detecting means for detecting noise, a talking microphone installed near the mouth position, a speaker installed near the ear position, first filter means connected to the noise detecting means, first adding/subtracting means for adding or subtracting by using an output of the talking microphone and an output of the first filter means, and sending the result to a talking signal output terminal, error detecting means installed near the ear position for detecting an output of the speaker and the noise, second filter means connected to the noise detecting means, and second adding/subtracting means for adding or subtracting by using an output of the second filter means and a receiving signal, and sending the result to the speaker, wherein the first filter means receives the detected noise, and a coefficient of the first filter means is updated by using the added or subtracted result outputted from the first adding/subtracting means, the second filter means receives the detected noise, and a coefficient of the second filter means is updated by using an output of the error detecting means, and the signal to be sent to the talking signal output terminal is also substantially sent to the speaker.

2. The noise cancellation system of claim 1, wherein the noise detecting means is provided at the back side of the speaker.

3. The noise cancellation system of claim 1, wherein the noise detecting means has a non-directional characteristic and is provided near the talking microphone, and the talking microphone has a maximum sensitivity substantially of a bidirectional characteristic in the direction of the talker's mouth position.

4. The noise cancellation system of claim 3, further comprising:

voice detecting means for detecting a voice signal from the output signal of the talking microphone, wherein the coefficient of the first filter means and/or the coefficient of the second filter means are not updated when the voice detecting means has detected the voice signal.

5. The noise cancellation system of claim 3, further comprising:

voice detecting means for detecting a voice signal from the receiving signal, wherein the coefficient of the second filter means is not updated when the voice detecting means has detected the voice signal.

6. The noise cancellation system of claim 1, further comprising:

voice detecting means for detecting a voice signal from the output signal of the talking microphone, wherein the coefficient of the first filter means and/or the coefficient of the second filter means are not updated when the voice detecting means has detected the voice signal.

7. The noise cancellation system of claim 1, comprising:

voice detecting means for detecting a voice signal from the receiving signal, wherein the coefficient of the second filter means is not updated when the voice detecting means has detected the voice signal.

8. The noise cancellation system of claim 1, wherein said noise cancellation system is configured as a headphone, and the noise detecting means, the speaker, the error detecting means, the first and second filter means, and the first and second adding/subtracting means are each provided as a set of two.

9. The noise cancellation system of claim 8, further comprising:

third filter means for the right side connected to the left noise detecting means of the two noise detecting means, and third filter means for the left side connected to the right noise detecting means of the two noise detecting means, wherein the third filter means for the right side makes use of an output of the right error detecting means of the two error detecting means, and updates the coefficient of the third filter means for the right side, an output of the third filter means for the right side and an output of the second adding/subtracting means for the right side of the two second adding/subtracting means are added or subtracted, and inputted into the right speaker of the two speakers, the third filter means for the left side makes use of an output of the left error detecting means of the two error detecting means, and updates the coefficient of the third filter means for the left side, and an output of the third filter means for the left side and an output of the second adding/subtracting means for the left side of the two second adding/subtracting means are added or subtracted, and inputted into the left speaker of the two speakers.

10. A noise cancellation system having a mouth position and an ear position, and comprising:

noise detecting means for detecting noise, a talking microphone installed near the mouth position, a speaker installed near the ear position, filter means connected to the noise detecting means, adding/subtracting means for adding or subtracting by using an output of the talking microphone and an output of the filter means, and sending out the result to a talking signal output terminal, and voice detecting means for detecting a voice signal from the output signal from the talking microphone, wherein the filter means receives the detected noise, and a coefficient of the filter means is updated by using the added or subtracted result directly from the adding/subtracting means, the coefficient of the filter means is not updated when the voice detecting means has detected the voice signal, and the signal to be sent to the talking signal output terminal is also substantially sent to the speaker.

11. A noise cancellation system having a mouth position and an ear position, and comprising:

noise detecting means for detecting noise, a talking microphone installed near the mouth position, a speaker installed near the ear position, filter means connected to the noise detecting means, and adding/subtracting means for adding or subtracting by using an output of the talking microphone and an output of the filter means, and sending out the result to a talking signal output terminal, wherein the noise detecting means has a non-directional characteristic and is provided near the talking microphone, the talking microphone has a maximum sensitivity substantially of a bidirectional characteristic in the direction of the talker's mouth position, and the filter means receives the detected noise, and a coefficient of the filter means is updated by using the added or subtracted result directly from the adding/subtracting means, and the signal to be sent to the talking signal output terminal is also substantially sent to the speaker.

12. The noise cancellation system of claim 11, further comprising:

voice detecting means for detecting a voice signal from the output signal of the talking microphone, wherein the coefficient of the filter means is not updated when the voice detecting means has detected the voice signal.

13. The noise cancellation system of claim 11, wherein said noise cancellation system is configured as a headphone, and the speaker and the error detecting means are each provided as a set of two.

14. A noise cancellation system having a mouth position and an ear position, and comprising:

a plurality of noise detectors for detecting noise, a head gear of cap shape, helmet shape or antenna shape fixing all or part of the noise detectors of the plurality of noise detectors, a first filter group having a plurality of first filters for receiving output signals from the noise detectors, a second filter group having a plurality of second filters for receiving output signals from the noise detectors, a talking microphone installed near the mouth position, a speaker installed near the ear position, and an error detector installed near the ear position; and wherein each output signal of the first filters is subtracted from an output signal of the talking microphone, each coefficient of the first filters is updated by using this subtraction signal, the subtraction signal is sent to a talking signal output terminal, each coefficient of the second filters is updated by making use of an output signal of the error detector, output signals of the second filter group, the subtraction signal, and a receiving signal from a receiving input terminal are added, and the sum signal is inputted into the speaker, and the signal to be sent to the talking signal output terminal is also substantially sent to the speaker.

15. A noise cancellation system having a mouth position and an ear position, and comprising:

noise detecting means for detecting noise, a talking microphone installed near the mouth position, a speaker installed near the ear position, first filter means connected to the noise detecting means, first adding/subtracting means for adding or subtracting by using an output of the talking microphone and an output of the first filter means, and sending the result to a talking signal output terminal, error detecting means installed near the ear position for detecting an output of the speaker and the noise, second filter means connected to the noise detecting means, second adding/subtracting means for adding or subtracting by using an output of the second filter means and a receiving signal, and sending the result to the speaker, and voice detecting means for detecting a voice signal from the receiving signal; and wherein the first filter means receives the detected noise, and a coefficient of the first filter means is updated by using the added or subtracted result outputted from the first adding/subtracting means, the second filter means receives the detected noise, and a coefficient of the second filter means is updated by using an output of the error detecting means, the coefficient of the second filter means is not updated when the voice detecting means has detected the voice signal, and the signal to be sent to the talking signal output terminal is also substantially sent to the speaker.

16. A noise cancellation system having a mouth position and an ear position, and comprising:

noise detecting means for detecting noise, a talking microphone installed near the mouth position, a speaker installed near the ear position, first filter means connected to the noise detecting means, first adding/subtracting means for adding or subtracting by using an output of the talking microphone and an output of the first filter means, and sending the result to a talking signal output terminal, error detecting means installed near the ear position for detecting an output of the speaker and the noise, second filter means connected to the noise detecting means, and second adding/subtracting means for adding or subtracting by using an output of the second filter means and a receiving signal, and sending the result to the speaker; and wherein the first filter means receives the detected noise, and a coefficient of the first filter means is updated by using the added or subtracted result outputted from the first adding/subtracting means, the second filter means receives the detected noise, and a coefficient of the second filter means is updated by using an output of the error detecting means, the noise detecting means has a non-directional characteristic and is provided near the talking microphone, the talking microphone has a maximum sensitivity substantially of a bidirectional characteristic in the direction of the talker's mouth position, and the signal to be sent to the talking signal output terminal is also substantially sent to the speaker.

17. The noise cancellation system of claim 16, further comprising:

voice detecting means for detecting a voice signal from the receiving signal, wherein the coefficient of the second filter means is not updated when the voice detecting means has detected the voice signal.

18. The noise cancellation system of claim 17, wherein said noise cancellation system is configured as a headphone, and the speaker, the error detecting means, the second filter means, and the second adding/subtracting means are each provided as a set of two.

19. The noise cancellation system of claim 17, further comprising:

voice detecting means for detecting a voice signal from the output signal of the talking microphone, wherein the coefficient of the first filter means and/or the coefficient of the second filter means are not updated when the voice detecting means has detected the voice signal.

20. A noise cancellation system having a mouth position and an ear position, and comprising:

noise detecting means for detecting noise, a talking microphone installed near the mouth position, a speaker installed near the ear position, filter means connected to the noise detecting means, and adding/subtracting means for adding or subtracting by using an output of the talking microphone and an output of the filter means, and sending out the result to a talking signal output terminal, wherein the noise detecting means has a non-directional characteristic and is provided near the talking microphone such that an output signal of the noise detecting means correlates to a noise component of the output of the talking microphone so that a combined directivity of the noise detecting means and the talking microphone is cardiodirectional, the talking microphone has a maximum sensitivity substantially of a bidirectional characteristic in the direction of the talker's mouth position, and the filter means receives the detected noise, and a coefecient of the filter means is updated by using the added or subtracted result from the adding/subtracting means.

21. The noise cancellation system of claim 20, further comprising:

voice detecting means for detecting a voice signal from the output signal of the talking microphone, wherein the coefficient of the filter means is not updated when the voice detecting means has detected the voice signal.

22. The noise cancellation system of claim 20, wherein said noise cancellation system is configured as a headphone, and the speaker and the error detecting means are each provided as a set of two.

23. The noise cancellation system of claim 20, wherein the signal to be sent to the talking signal output terminal is also substantially sent to the speaker.

24. A noise cancellation system having a mouth position and an ear position, and comprising:

noise detecting means for detecting noise, a talking microphone installed near the mouth position, a speaker installed near the ear position, first filter means connected to the noise detecting means, fist adding/subtracting means for adding or subtracting by using an output of the talking microphone and an output of the first filter means, and sending the result to a talking signal output terminal, error detecting means installed near the ear position for detecting an output of the speaker and the noise, second filter means connected to the noise detecting means, and second adding/subtracting means for adding or subtracting by using an output of the second filter means and a receiving signal, and sending the result to the speaker, wherein the first filter means receives the detected noise, sad a coefficient of the first filter means is updated by using the added or subtracted result outputted from the first adding/subtracting means, the second filter means receives the detected noise, and a coefficient of the second filter means is updated by using an output of the error detecting means, the noise detecting means has a non-directional characteristic and is provided near the talking microphone such that an output signal of the noise detecting means correlates to a noise component of the output of the talking microphone so that a combined directivity of the noise detecting means and the talking microphone is cardiodirectional, and the talking microphone has a maximum sensitivity substantially of a bidirectional characteristic in the direction of the talker's mouth position.

25. The noise cancellation system of claim 24, further comprising:

voice detecting means for detecting a voice signal from the output signal of the talking microphone, wherein the coefficient of the first filter means and/or the coefficient of the second filter means are not updated when the voice detecting means has detected the voice signal.

26. The noise cancellation system of claim 25, wherein the signal to be sent to the talking signal output terminal is also substantially sent to the speaker.

27. The noise cancellation system of claim 24, further comprising:

voice detecting means for detecting a voice signal from the receiving signal, wherein the coefficient of the second filter means is not updated when the voice detecting means has detected the voice signal.

28. The noise cancellation system of claim 27, wherein the signal to be sent to the talking signal output terminal is also substantially sent to the speaker.

29. The noise cancellation system of claim 24, wherein the signal to be sent to the talking signal output terminal is also substantially sent to the speaker.

* * * * *

UNITED STATES PATENT AND TRADEMARK OFFICE
CERTIFICATE OF CORRECTION

PATENT NO. : 6,041,126                                            Page 1 of 1
DATED : March 21, 2000
INVENTOR(S) : Kenichi Teral, et al.

It is certified that error appears in the above-identified patent and that said Letters Patent is hereby corrected as shown below:

In column 15, line 9, change "sad" to --and--.In column 15, line 9, change "sad" to --and--.

Signed and Sealed this

Fifth Day of June, 2001

Attest:

*Attesting Officer*

NICHOLAS P. GODICI

*Acting Director of the United States Patent and Trademark Office*

UNITED STATES PATENT AND TRADEMARK OFFICE
CERTIFICATE OF CORRECTION

PATENT NO.   : 6,041,126
DATED        : March 21, 2000
INVENTOR(S)  : Kenichi Teral et al.

It is certified that error appears in the above-identified patent and that said Letters Patent is hereby corrected as shown below:

Column 15,
Line 9, change "sad" to -- and --.

This certificate supersedes Certificate of Correction issued June 5, 2001.

Signed and Sealed this

Twenty-seventh Day of August, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,041,126
DATED         : March 21, 2000
INVENTOR(S)   : Kenichi Terai et al.

It is certified that error appears in the above-identified patent and that said Letters Patent is hereby corrected as shown below:

Column 15,
Line 9, change "sad" to -- and --.

This certificate supersedes Certificate of Correction issued August 27, 2002.

Signed and Sealed this

Twelfth Day of August, 2003

JAMES E. ROGAN
*Director of the United States Patent and Trademark Office*